United States Patent
Kao et al.

(10) Patent No.: US 8,767,115 B2
(45) Date of Patent: Jul. 1, 2014

(54) IMAGE CAPTURING DEVICE WITH AUTO-FOCUS FUNCTION AND AUTO-FOCUS METHOD

(75) Inventors: Chuan-Yen Kao, New Taipei (TW); Li-Jen Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/603,434

(22) Filed: Sep. 5, 2012

(65) Prior Publication Data

US 2014/0036111 A1    Feb. 6, 2014

(30) Foreign Application Priority Data

Aug. 3, 2012    (TW) ............... 101128003 A

(51) Int. Cl.
*G03B 13/00*    (2006.01)
*H04N 5/222*    (2006.01)

(52) U.S. Cl.
USPC ..................................... 348/345; 348/333.11

(58) Field of Classification Search
CPC ............ H04N 5/23293; H04N 5/2251; H04N 2101/00; H04N 5/772
USPC ............. 348/333.02–333.05, 333.11–333.12, 348/240.99, 345–347; 715/838
See application file for complete search history.

(56) References Cited

U.S. PATENT DOCUMENTS

| | | | | |
|---|---|---|---|---|
| 2004/0246360 A1* | 12/2004 | Stavely et al. | ............ | 348/333.11 |
| 2008/0158407 A1* | 7/2008 | Funamoto | ..................... | 348/345 |
| 2009/0060487 A1 | 3/2009 | Lee | | |
| 2009/0256925 A1* | 10/2009 | Yoshizumi | ................. | 348/222.1 |
| 2010/0289937 A1* | 11/2010 | Hada | ....................... | 348/333.01 |

FOREIGN PATENT DOCUMENTS

TW    201019711    5/2010

OTHER PUBLICATIONS

Office action mailed on Feb. 18, 2014 for the Taiwan application No. 101128003, filing date: Aug. 3, 2012, p. 1 line 13~14, p. 2~4 and p. 5 line 1~2.

* cited by examiner

*Primary Examiner* — Mekonnen Dagnew
(74) *Attorney, Agent, or Firm* — Winston Hsu; Scott Margo

(57) ABSTRACT

An auto-focus method includes steps of receiving a first image from an image capturing unit, wherein the first image conforms to a first resolution of the image capturing unit; setting a focus frame in the first image; converting the first image into a second image, wherein the second image conforms to a second resolution of a display unit and the second resolution is smaller than the first resolution; and displaying the second image and the first image within the focus frame in the display unit.

4 Claims, 4 Drawing Sheets

IMAGE CAPTURING DEVICE WITH AUTO-FOCUS FUNCTION AND AUTO-FOCUS METHOD

BACKGROUND OF THE INVENTION

1. Field of the Invention

The invention relates to an image capturing device and, more particularly, to an image capturing device with auto-focus function and an auto-focus method.

2. Description of the Prior Art

As digital camera module is getting more and more popular, so far most of electronic devices, such as cell phones, flat computers, personal digital assistants, etc., are equipped with a digital camera module. Furthermore, the resolution of the digital camera module is increasing continuously. However, the resolution of a display panel is limited due to current technology such that the display panel cannot render image information captured by the digital camera module completely. For example, the maximum resolution of a display panel on a cell phone is only about 1280*720 (i.e. 1M) but the resolution of a digital camera module has achieved about 3264*2448 (i.e. 8M). Since the resolution of the display panel is smaller than that of the digital camera module, a user cannot determine whether a focus frame displayed by the display panel has caught correct focus by his or her eyes. In other words, the user cannot know whether an image is defined while focusing or taking the image. To ensure the definition of the image, the user has to open and zoom in parts of the stored image or use zoom in/out function while taking the image. However, the aforesaid manners are inconvenient and waste time.

SUMMARY OF THE INVENTION

The invention provides an image capturing device with auto-focus function and an auto-focus method so as to solve the aforesaid problems.

According to the claimed invention, an auto-focus method comprises steps of receiving a first image from an image capturing unit, wherein the first image conforms to a first resolution of the image capturing unit; setting a focus frame in the first image; converting the first image into a second image, wherein the second image conforms to a second resolution of a display unit and the second resolution is smaller than the first resolution; and displaying the second image and the first image within the focus frame in the display unit.

According to the claimed invention, the auto-focus method further comprises steps of calculating a central coordinate of the focus frame within the first image; calculating a display coordinate of the focus frame within the display unit according to the central coordinate, the first resolution and the second resolution; and taking the display coordinate as a center of the focus frame to attach the first image within the focus frame onto the second image.

According to the claimed invention, if the central coordinate is defined as (AFx,AFy), the first resolution is defined as CRx*CRy, and the second resolution is defined as DRx*DRy, the display coordinate is represented as $$\left(\frac{DRx}{CRx}AFx, \frac{DRy}{CRy}AFy\right).$$

According to the claimed invention, the auto-focus method further comprises steps of allowing a user to zoom in or zoom out the first image within the focus frame when the second image and the first image within the focus frame are displayed in the display unit.

According to the claimed invention, an image capturing device with auto-focus function comprises an image capturing unit for capturing a first image, wherein the first image conforms to a first resolution of the image capturing image; an image signal processing unit, electrically connected to the image capturing unit, for receiving the first image and setting a focus frame in the first image; an image converting unit, electrically connected to the image signal processing unit, for converting the first image into a second image; and a display unit, electrically connected to the image signal processing unit and the image converting unit, for displaying the second image and the first image within the focus frame, wherein the second image conforms to a second resolution of the display unit and the second resolution is smaller than the first resolution.

According to the claimed invention, the image signal processing unit calculates a central coordinate of the focus frame within the first image, calculates a display coordinate of the focus frame within the display unit according to the central coordinate, the first resolution and the second resolution, and takes the display coordinate as a center of the focus frame to attach the first image within the focus frame onto the second image.

According to the claimed invention, if the central coordinate is defined as (AFx,AFy), the first resolution is defined as CRx*CRy, and the second resolution is defined as DRx*DRy, the display coordinate is represented as $$\left(\frac{DRx}{CRx}AFx, \frac{DRy}{CRy}AFy\right).$$

According to the claimed invention, the image capturing device with auto-focus function further comprises a touch unit, electrically connected to the image signal processing unit, for zooming in or zooming out the first image within the focus frame when the second image and the first image within the focus frame are displayed in the display unit.

As mentioned in the above, the invention displays the image within the focus frame with larger resolution in the display unit with smaller resolution while focusing such that a user can determine whether the desired image is defined enough. Accordingly, the user can take a defined image rapidly and conveniently without wasting additional time to determine whether the image is defined enough.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
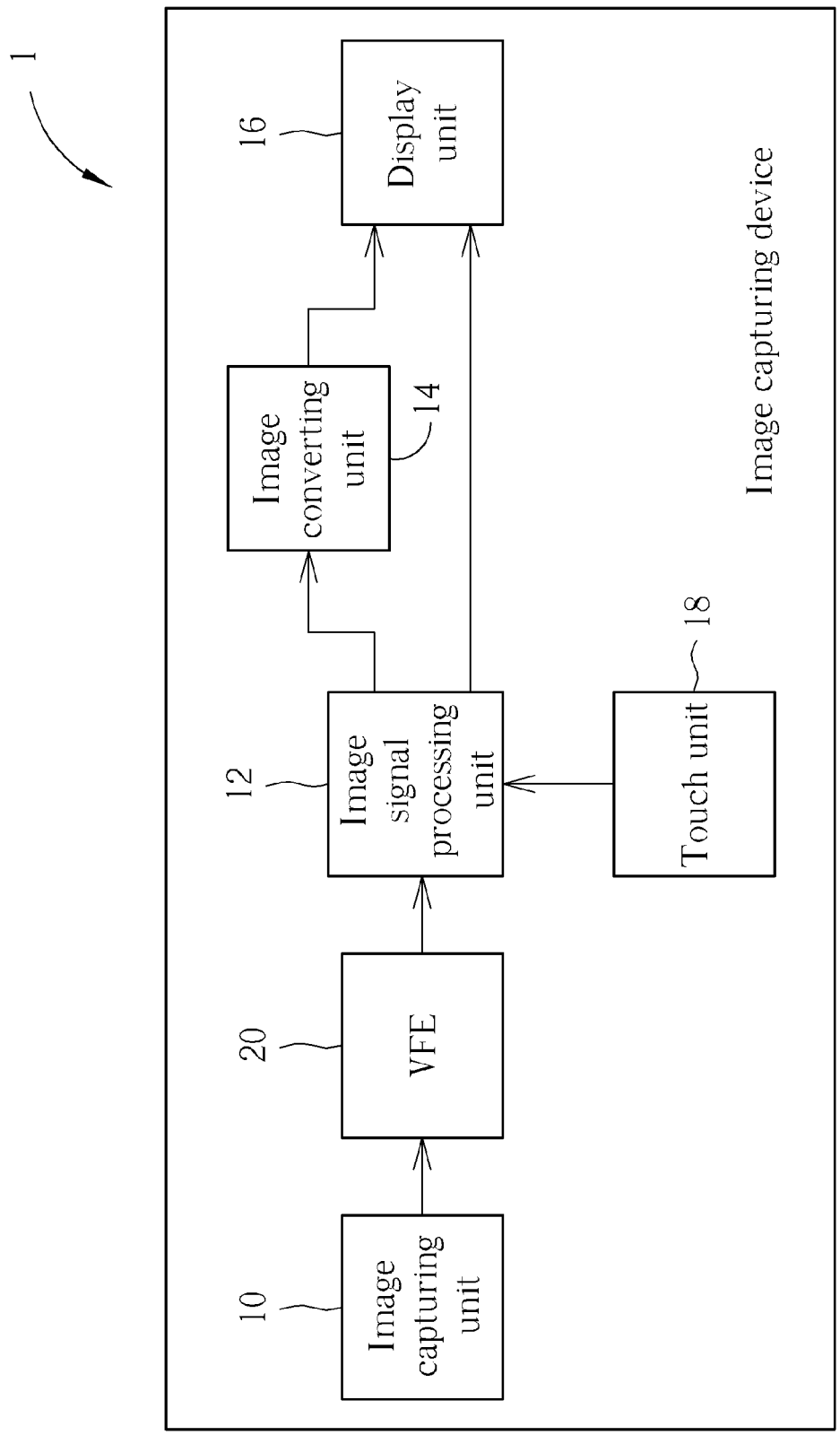
FIG. 1 is a functional block diagram illustrating an image capturing device with auto-focus function according to an embodiment of the invention.
Figure 2:
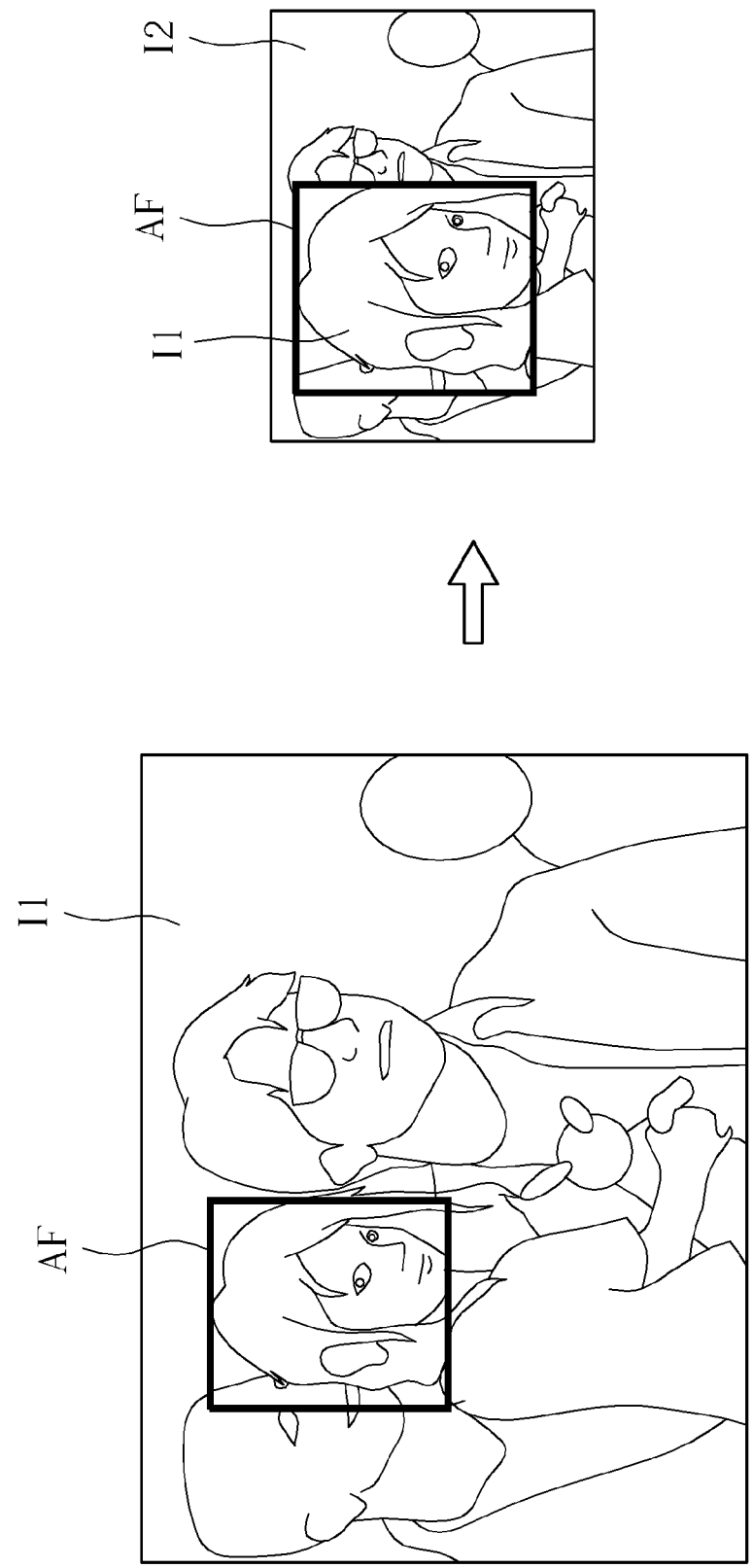
FIG. 2 is a schematic diagram illustrating a first image captured by the image capturing unit and a second image displayed in the display unit.

Referring to FIGS. 1 and 2, FIG. 1 is a functional block diagram illustrating an image capturing device 1 with auto-focus function according to an embodiment of the invention, and FIG. 2 is a schematic diagram illustrating a first image I1 captured by the image capturing unit 10 and a second image I2 displayed in the display unit 16. As shown in FIG. 1, the image capturing device 1 comprises an image capturing unit 10, an image signal processing unit 12, an image converting unit 14, a display unit 16, a touch unit 18 and a video front end (VFE) 20, wherein the image signal processing unit 12 is electrically connected to the image capturing unit 10 through the VFE 20, the image converting unit 14 is electrically connected to the image signal processing unit 12, the display unit 16 is electrically connected to the image signal processing unit 12 and the image converting unit 14, and the touch unit 18 is electrically connected to the image signal processing unit 12.

In this embodiment, the image capturing device 1 may be a cell phone, flat computer, personal digital assistant or other electronic devices with image capturing function and auto-focus function; the image capturing unit 10 may be, but not limited to, a charge-coupled device (CCD) sensor or complementary metal-oxide semiconductor (CMOS) sensor; the image signal processing unit 12 may be an image signal processor (ISP); the image converting unit 14 may be a circuit capable of zooming in/out and cropping an image; the display unit 16 may be a liquid crystal display (LCD) panel or other display devices; the touch unit 18 may be a resistance-type touch panel, capacitance-type touch panel or other touch devices. In this embodiment, the image capturing unit 10 has a first resolution CRx*CRy (e.g. 3264*2448) and the display unit 16 has a second resolution DRx*DRy (e.g. 1280*720), wherein the second resolution DRx*DRy is smaller than the first resolution CRx*CRy.

When a user uses the image capturing device 1 of the invention to take a picture, the image capturing unit 10 is used for capturing a first image I1 (as shown in FIG. 2). In this embodiment, since the image capturing unit 10 has the first resolution CRx*CRy, the first image I1 also conforms to the first resolution CRx*CRy of the image capturing unit 10. After capturing the first image I1, the image capturing unit 10 transmits the first image I1 to the VFE 20. The VFE 20 converts the first image I1 into color information (e.g. RGB, YUV, etc.) and then transmits the converted first image I1 to the image signal processing unit 12. In this embodiment, the image signal processing unit 12 can be used for processing the first image I1 with functions of auto-focus, auto-white balance, auto-exposure, and so on. When the user half-presses a shutter button of the image capturing device 1 to start auto-focus function, the image signal processing unit 12 will set a focus frame AF in the first image I1, as shown in FIG. 2. In practical applications, the first image I1 may be stored in a built-in or external buffer of the image signal processing unit 12 temporarily. It should be noted that the setting of the focus frame AF can be achieved by conventional focus technology and will not be depicted in detail herein.

Afterward, the image converting unit 14 converts the first image I1 with the first resolution CRx*CRy into a second image I2 capable of being displayed in the display unit 16 according to the second resolution DRx*DRy of the display unit 16, as shown in FIG. 2. In other words, since the display unit 16 has the second resolution DRx*DRy, the second image I2 also conforms to the second resolution DRx*DRy of the display unit 16. Then, the image signal processing unit 12 calculates a central coordinate (AFx,AFy) of the focus frame AF within the first image I1, calculates a display coordinate $$\left(\frac{DRx}{CRx}AFx, \frac{DRy}{CRy}AFy\right)$$

of the focus frame AF within the display unit 16 according to the central coordinate (AFx,AFy), the first resolution CRx*CRy and the second resolution DRx*DRy, and takes the display coordinate $$\left(\frac{DRx}{CRx}AFx, \frac{DRy}{CRy}AFy\right)$$

as a center of the focus frame AF to attach the first image I1 within the focus frame AF onto the second image I2, as shown in FIG. 2. Finally, the second image I2 and the first image I1 within the focus frame AF are displayed in the display unit 16.

Accordingly, the image capturing device 1 of the invention can display the first image I1 within the focus frame AF with larger resolution (i.e. the aforesaid first resolution CRx*CRy) in the display unit 16 with smaller resolution (i.e. the aforesaid second resolution DRx*DRy) while focusing such that a user can determine whether the desired image is defined enough. In this embodiment, when the second image I2 and the first image I1 within the focus frame AF are displayed in the display unit 16, the user can operate the touch unit 18 to zoom in or zoom out the first image I1 within the focus frame AF such that the user can further determine the definition of the first image I1 within the focus frame AF.

Figure 3:
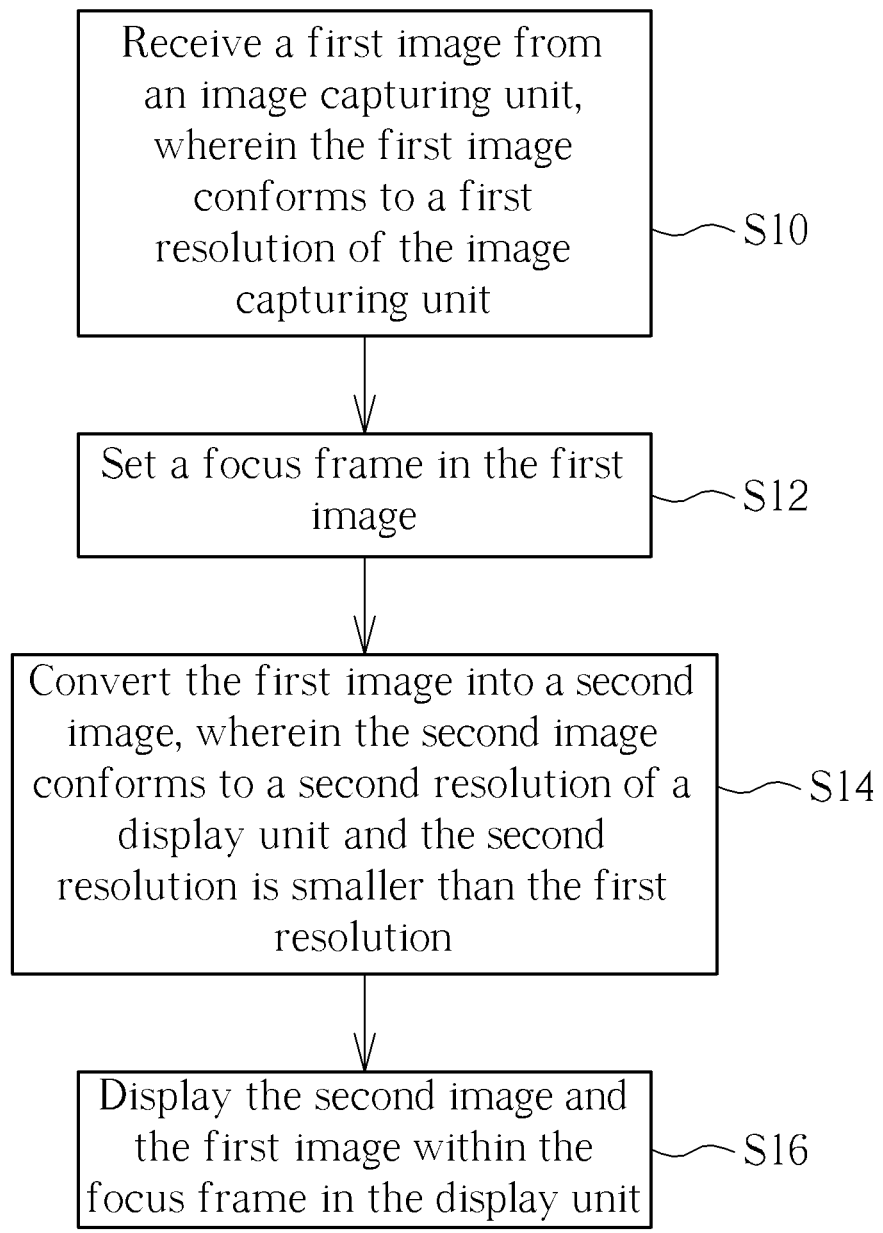
FIG. 3 is a flowchart illustrating an auto-focus method according to an embodiment of the invention.
Figure 4:
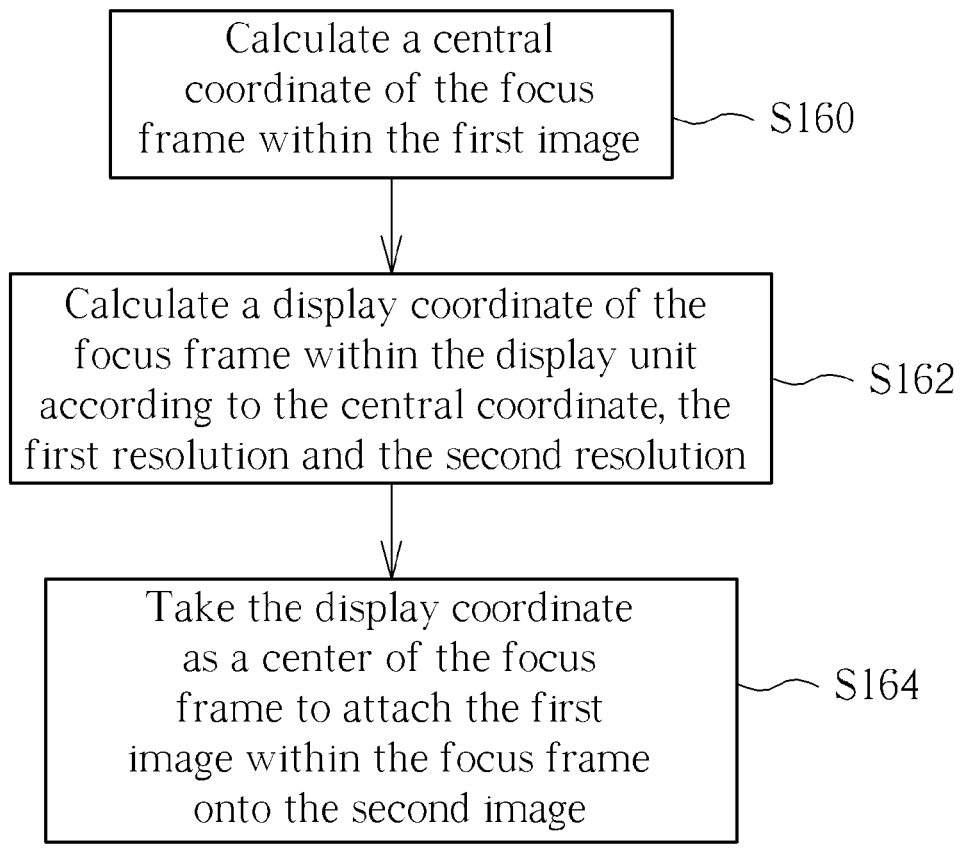
FIG. 4 is a flowchart illustrating step S16 shown in FIG. 3 in detail.

Referring to FIGS. 3 and 4, FIG. 3 is a flowchart illustrating an auto-focus method according to an embodiment of the invention, and FIG. 4 is a flowchart illustrating step S16 shown in FIG. 3 in detail. The auto-focus method shown in FIG. 3 can be implemented by the image capturing device 1 shown in FIG. 1. First of all, step S10 is performed to receive a first image I1 from an image capturing unit 10, wherein the first image I1 conforms to a first resolution CRx*CRy of the image capturing unit 10. Afterward, step S12 is performed to set a focus frame AF in the first image I1. Step S14 is then performed to convert the first image I1 into a second image I2, wherein the second image I2 conforms to a second resolution DRx*DRy of a display unit 16 and the second resolution DRx*DRy is smaller than the first resolution CRx*CRy. Finally, step S16 is performed to display the second image I2 and the first image I1 within the focus frame AF in the display unit 16. Furthermore, the auto-focus method of the invention may allow a user to operate the touch unit 18 to zoom in or zoom out the first image I1 within the focus frame AF when the second image I2 and the first image I1 within the focus frame AF are displayed in the display unit 16.

In this embodiment, the image signal processing unit 12 can utilizes steps S160-S164 shown in FIG. 4 to display the second image I2 and the first image I1 within the focus frame AF in the display unit 16. First of all, step S160 is performed to calculate a central coordinate (AFx,AFy) of the focus frame AF within the first image I1. Afterward, step S162 is performed to calculate a display coordinate $$\left(\frac{DRx}{CRx}AFx, \frac{DRy}{CRy}AFy\right)$$

of the focus frame AF within the display unit 16 according to the central coordinate (AFx,AFy), the first resolution CRx*CRy and the second resolution DRx*DRy. Finally, step S164 is performed to take the display coordinate $$\left(\frac{DRx}{CRx}AFx, \frac{DRy}{CRy}AFy\right)$$

as a center of the focus frame AF to attach the first image I1 within the focus frame AF onto the second image I2.

Furthermore, the control logic of the auto-focus method shown in FIGS. 3 and 4 can be implemented by software. Needless to say, each part or function of the control logic may be implemented by software, hardware or the combination thereof. Moreover, the control logic can be embodied by a computer readable storage medium, wherein the computer readable storage medium stores instructions, which can be executed by the image capturing device 1 so as to generate control command for executing corresponding function.

As mentioned in the above, the invention displays the image within the focus frame with larger resolution in the display unit with smaller resolution while focusing such that a user can determine whether the desired image is defined enough. Accordingly, the user can take a defined image rapidly and conveniently without wasting additional time to determine whether the image is defined enough.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-focus method comprising:
    receiving a first image from an image capturing unit, wherein the first image conforms to a first resolution of the image capturing unit;
    setting a focus frame in the first image;
        converting the first image into a second image, wherein the second image conforms to a second resolution of a display unit and the second resolution is smaller than the first resolution; and
        displaying the second image and the first image within the focus frame in the display unit;
        wherein the auto-focus method further comprises:
        calculating a central coordinate of the focus frame within the first image; calculating a display coordinate of the focus frame within the display unit according to the central coordinate, the first resolution and the second resolution; and taking the display coordinate as a center of the focus frame to attach the first image within the focus frame onto the second image, wherein if the central coordinate is defined as (AFx,AFy), the first resolution is defined as CRx*CRy, and the second resolution is defined as DRx*DRy, the display coordinate is represented as $$\left(\frac{DRx}{CRx}AFx, \frac{DRy}{CRy}AFy\right).$$

2. The auto-focus method of claim 1, further comprising:
    allowing a user to zoom in or zoom out the first image within the focus frame when the second image and the first image within the focus frame are displayed in the display unit.

3. An image capturing device with auto-focus function comprising:
    an image capturing unit for capturing a first image, wherein the first image conforms to a first resolution of the image capturing image;
    an image signal processing unit, electrically connected to the image capturing unit, for receiving the first image and setting a focus frame in the first image;
    an image converting unit, electrically connected to the image signal processing unit, for converting the first image into a second image; and
    a display unit, electrically connected to the image signal processing unit and the image converting unit, for displaying the second image and the first image within the focus frame, wherein the second image conforms to a second resolution of the display unit and the second resolution is smaller than the first resolution; wherein the image signal processing unit calculates a central coordinate of the focus frame within the first image, calculates a display coordinate of the focus frame within the display unit according to the central coordinate, the first resolution and the second resolution, and takes the display coordinate as a center of the focus frame to attach the first image within the focus frame onto the second image, wherein if the central coordinate is defined as (AFx,AFy), the first resolution is defined as CRx*CRy, and the second resolution is defined as DRx*DRy, the display coordinate is represented as $$\left(\frac{DRx}{CRx}AFx, \frac{DRy}{CRy}AFy\right).$$

4. The image capturing device with auto-focus function of claim 3, further comprising a touch unit, electrically connected to the image signal processing unit, for zooming in or zooming out the first image within the focus frame when the second image and the first image within the focus frame are displayed in the display unit.

* * * * *